United States Patent
Ollila

(10) Patent No.: US 7,327,588 B2
(45) Date of Patent: Feb. 5, 2008

(54) SYNCHRONIZATION OF PARALLEL-CONNECTED INVERTER UNITS OR FREQUENCY CONVERTERS

(75) Inventor: Jaakko Ollila, Pirkkala (FI)

(73) Assignee: Vacon Oyj, Vaasa (FI)

( * ) Notice: Subject to any disclaimer, the term of this patent is extended or adjusted under 35 U.S.C. 154(b) by 401 days.

(21) Appl. No.: 11/057,130

(22) Filed: Feb. 15, 2005

(65) Prior Publication Data
US 2005/0179419 A1    Aug. 18, 2005

(30) Foreign Application Priority Data
Feb. 16, 2004  (FI) ................... 20040241
Jun. 14, 2004  (FI) ................... 20040814

(51) Int. Cl.
*H02M 7/00*    (2006.01)
(52) U.S. Cl. ........................................ 363/71
(58) Field of Classification Search .................. 363/65, 363/71, 72, 157, 159; 307/82
See application file for complete search history.

(56) References Cited

U.S. PATENT DOCUMENTS

| 4,677,535 | A | * | 6/1987 | Kawabata et al. ............. 363/65 |
| 5,257,180 | A |   | 10/1993 | Sashida et al. |
| 5,325,285 | A |   | 6/1994 | Araki |
| 5,390,102 | A |   | 2/1995 | Araki |
| 5,460,244 | A |   | 10/1995 | Tanahashi |
| 5,956,244 | A |   | 9/1999 | Rehm et al. |
| 6,741,483 | B1 | * | 5/2004 | Stanley ......................... 363/65 |
| 2002/0027791 | A1 |   | 3/2002 | Yoshioka et al. |
| 2004/0017689 | A1 |   | 1/2004 | Zhang et al. |
| 2004/0032755 | A1 | * | 2/2004 | Pollanen et al. .............. 363/71 |
| 2005/0117373 | A1 | * | 6/2005 | Ling ........................... 363/71 |

FOREIGN PATENT DOCUMENTS

| EP | 1 120 897 A2 | 8/2001 |
| WO | WO 03/058803 A1 | 7/2003 |

* cited by examiner

*Primary Examiner*—Adolf Berhane
(74) *Attorney, Agent, or Firm*—Birch, Stewart, Kolasch & Birch, LLP

(57) ABSTRACT

A method for the synchronization of parallel-connected inverter units (INU1, INU2) or frequency converters and an inverter apparatus or a frequency converter apparatus wherein the inverter units are provided with inverter-specific modulators, in which method the circulating current between the inverter units is measured, and the modulators are synchronized to each other on the basis of the current measurement data.

12 Claims, 5 Drawing Sheets

SYNCHRONIZATION OF PARALLEL-CONNECTED INVERTER UNITS OR FREQUENCY CONVERTERS

The present invention relates to a method for synchronizing inverter units or frequency converters connected in parallel. The invention also relates to an inverter apparatus.

Inverter units are used as motor feeding devices and also as so-called mains inverters in frequency converter systems operated on the PWM principle.

The invention also concerns a method for synchronizing parallel-connected PWM frequency converters that are capable of feeding the braking energy coming from the load back to the supply network via so-called mains inverters. The invention also relates to an electric drive consisting of parallel-connected PWM-frequency converters capable of re-injecting braking energy into the supply network. The invention expressly relates to a parallel connection arrangement where the frequency converters are fed from a common supply and their outputs are galvanically connected to each other e.g. at the connection terminals of a motor or at the common star point of separate windings.

Mains inverters are used between a supply network and d.c. rails in systems where a capability of re-injecting braking energy into the supply network is required and/or the mains current is required to have a very low harmonics content. A mains inverter consists of an inverter unit and a mains filter (LFU). The inverter unit used in mains inverters may be mechanically identical to that feeding the motor, differing from it only in respect of software. As a mains inverter, the inverter unit produces from the direct voltage of the direct-current rails an alternating voltage on the supply network side. As is known, a voltage pattern produced by the PWM principle generates harmonics, in this case in the current of the supply network. To limit the harmonics, a filter is needed between the supply network and the inverter unit. This filter is usually an LCL-type filter, see FIGS. 1 and 5. In a motor feeding application, the stray reactances of the motor used as load usually serve as a sufficient harmonics filter.

In high-power applications, several inverter units or entire frequency converters have to be connected in parallel. An example of parallel connection in a mains inverter application is presented in FIG. 2, which shows two parallel-connected inverter units INU1 and INU2 connected to a three-phase electric network $U_L$ via an LCL filter unit consisting of inductors $L_1$ and $L_2$ and a capacitor $C_1$. Another example of parallel connection is presented in FIG. 6, which shows two parallel-connected frequency converters FC1 and FC2 capable of re-injecting braking energy into the supply network, which are connected on the supply side to the same three-phase alternating-current electric network $U_L$ via filter units LFU1 and LFU2 and which are connected together on the output side at the common star point of the separate windings of the motor.

Figure 3:
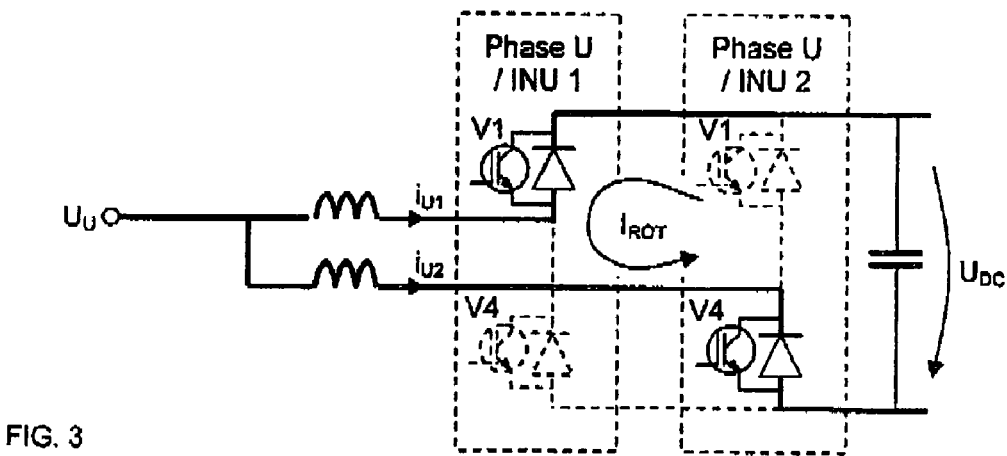
Figure 7:
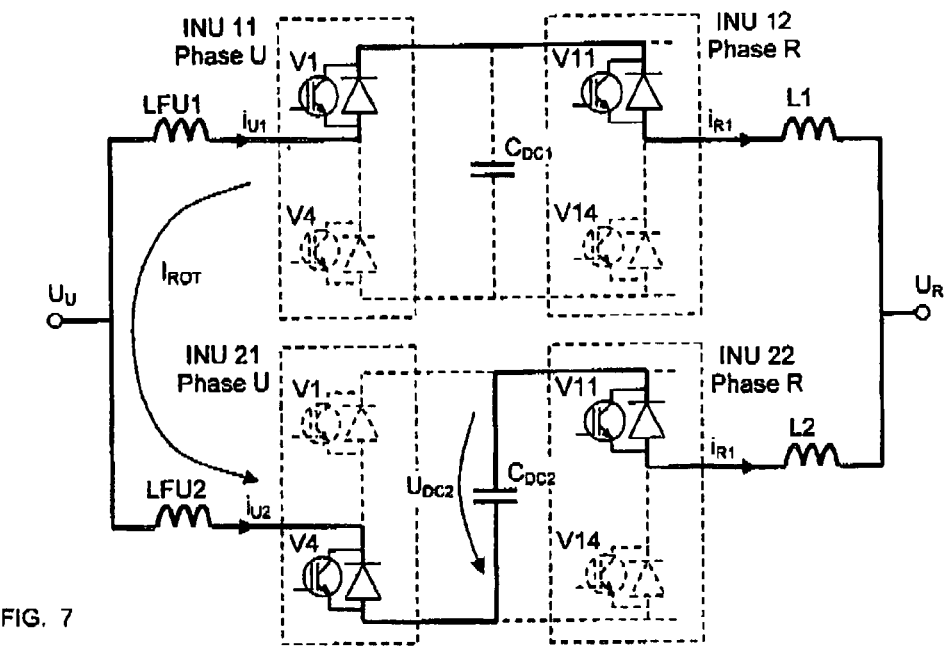

The problem in such an arrangement arises from the circumstance that the higher control system common to the parallel-connected units only takes care of keeping the fundamental components of the voltages produced by the inverter units in phase, whereas actual control of the phase switches of the inverter units is taken care of by inverter unit-specific PWM modulators independent of each other. Therefore, there may occur a situation where the switches of the same phase in different INUs are not turned simultaneously in the same direction but may be momentarily in opposite positions e.g. as illustrated in FIGS. 3 and 7. This gives rise to a circulating current ($i_{ROT}$), which causes extra stresses on the converter and the input inductor (FIG. 3). FIG. 7 presents a situation where the switches of the same phase in the inverter units on the network side are in different positions while the switches of the inverter units on the motor side are in the same position. As can be seen from the example in the figure, in this situation the intermediate circuit voltage $U_{DC2}$ of the other frequency converter produces a circulating current ($i_{ROT}$), which is limited in the first place by the inductances of the filter units and motor cables. The circulating current causes extra stresses e.g. on the main circuit power switches.

A prior-art method for preventing this problem is to use INU-specific or frequency converter-specific isolation transformers, in which case the input circuits are galvanically separated from each other and therefore no circulating current can be set up. However, this solution is awkward in many senses; it takes up a large space, is remarkably expensive etc.

Another prior-art method of preventing this problem is to use a common PWM modulator to produce phase switch control signals which are distributed to all the parallel inverter units. However, this can not be accomplished without difficult special arrangements.

U.S. Pat. No. 5,257,180 discloses a control system comprising a separate synchronization circuit serving to synchronize parallel-connected inverters, from which circuit are obtained common synchronizing signals. The apparatus additionally comprises a detector circuit to detect current components flowing between the inverters, and a control circuit to control the inverter output voltages, which can be used to reduce the circulating currents between the inverters.

The object of the present invention is to overcome the drawbacks of prior art and in particular to achieve a solution for the synchronization of parallel-connected inverter units that is simpler than prior-art solutions. A further object of the invention is to create a solution for the synchronization of parallel-connected inverter units that is simpler than prior-art solutions, designed for use in an electric drive capable of re-injecting braking energy into the supply network and containing at least two parallel-connected inverter units both on the mains side and on the motor side.

The present invention exploits the fact that the inverter unit normally comprises measurement of current ($i_U$, $i_V$ and $i_W$ in FIG. 1, $i_U$, $i_V$, $i_W$ and $i_R$, $i_S$, $i_T$ in FIG. 5) in each phase as a standard feature. According to the present invention, the inverter unit-specific modulators are synchronized to each other on the basis of the current measurement data without any additional electronics. Therefore, the parallel connections can be implemented using standard units, which is a great advantage as compared with prior-art methods.

In the method of the invention, the modulation pulse patterns are synchronized to each other by measuring the modulation-frequency circulating current which arises due to the phase difference between the zero components of the three-phase voltage pattern produced by the phase switches.

In an embodiment of the method of the invention, the same switching frequency $f_{K1}$ is used in all the inverter units comprised in the mains inverter, this frequency being different from the switching frequency $f_{K2}$ used in all the inverter units feeding the motor. The modulation pulse patterns of both the units re-injecting braking energy into the supply network and the units feeding the motor are synchronized with each other by measuring the modulation-frequency circulating current characteristic of each switching frequency which is generated by the phase difference between the zero components of the three-phase voltage pattern produced by the phase switches.

The details of the features characteristic of the solution of the invention are presented in the claims below.

Figure 1:
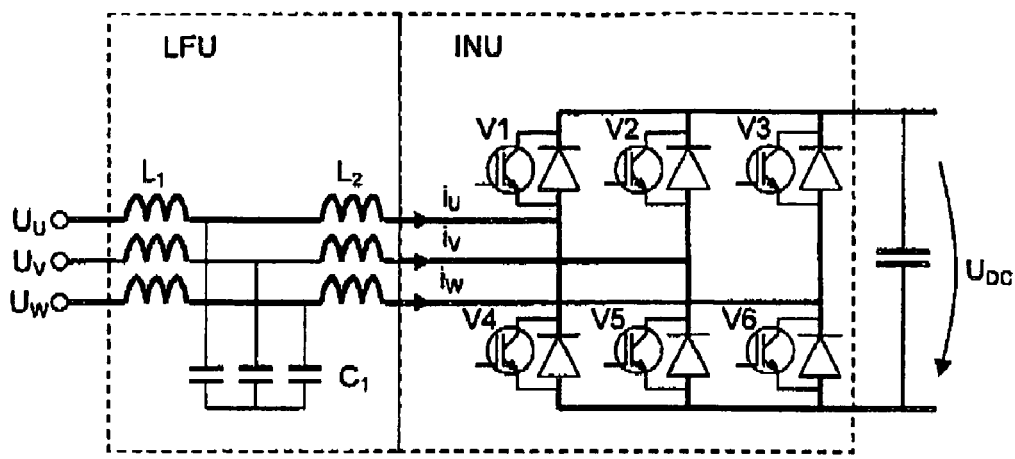
Figure 2:
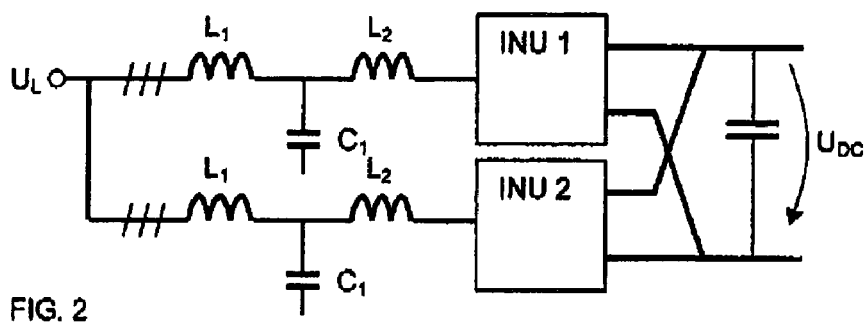
Figure 4:
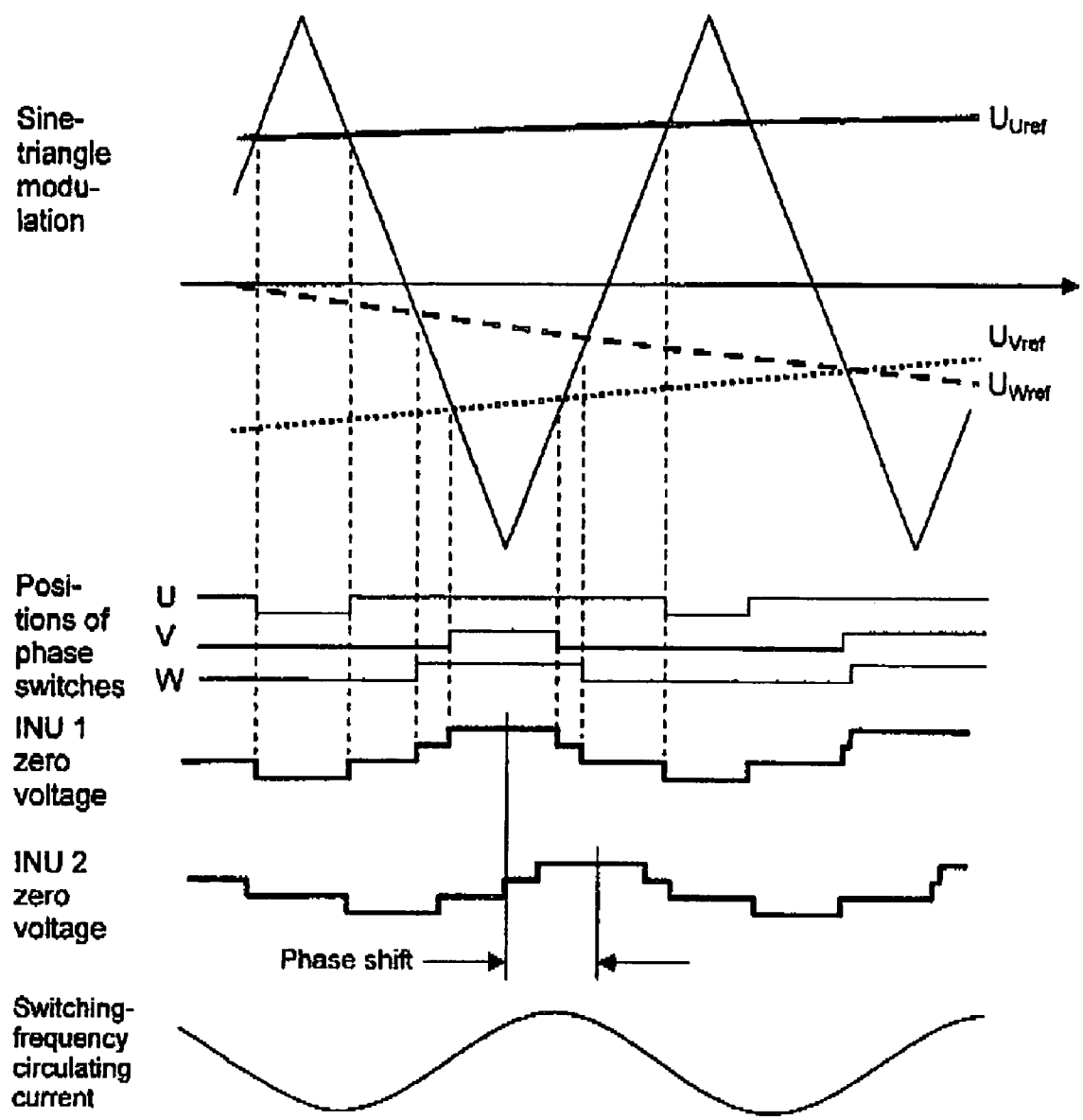
Figure 5:
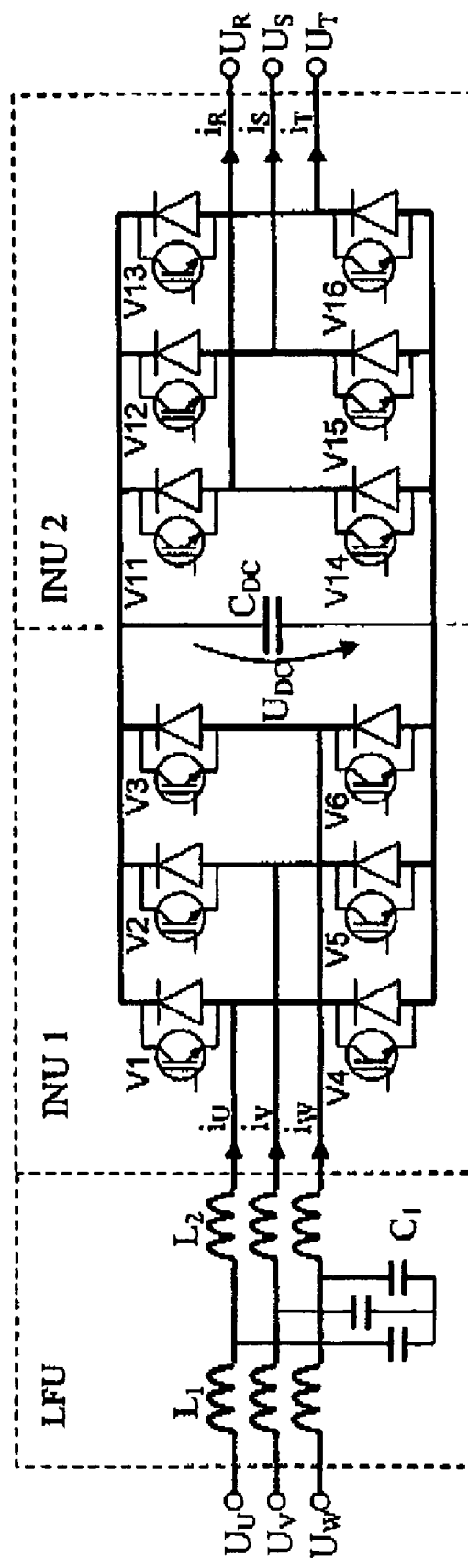
Figure 6:
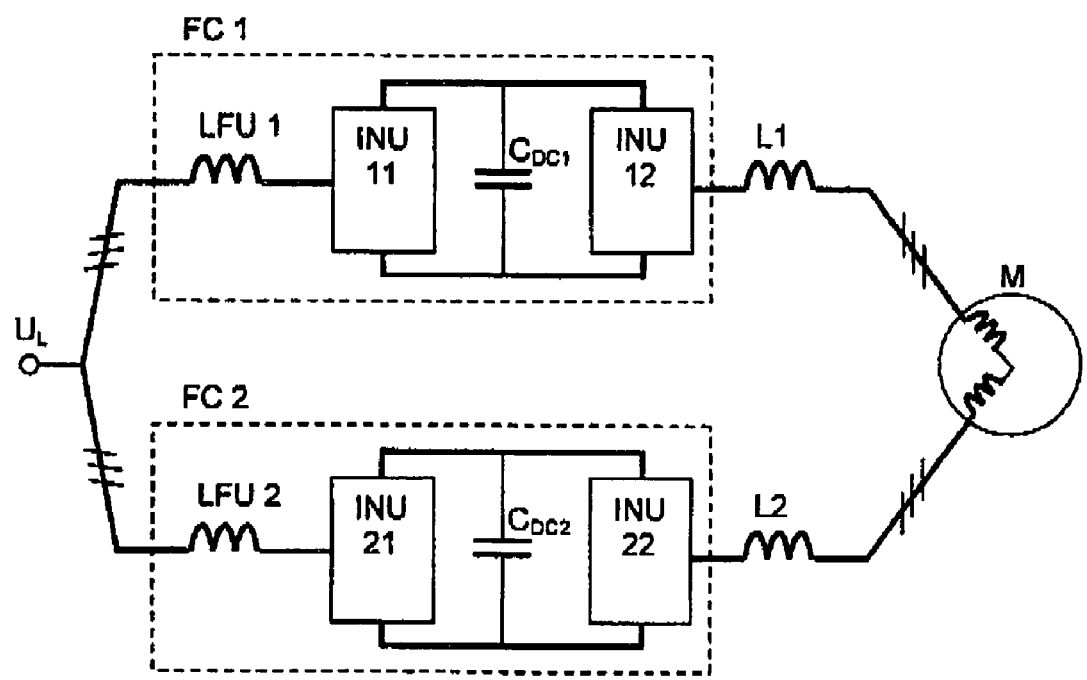
Figure 8:
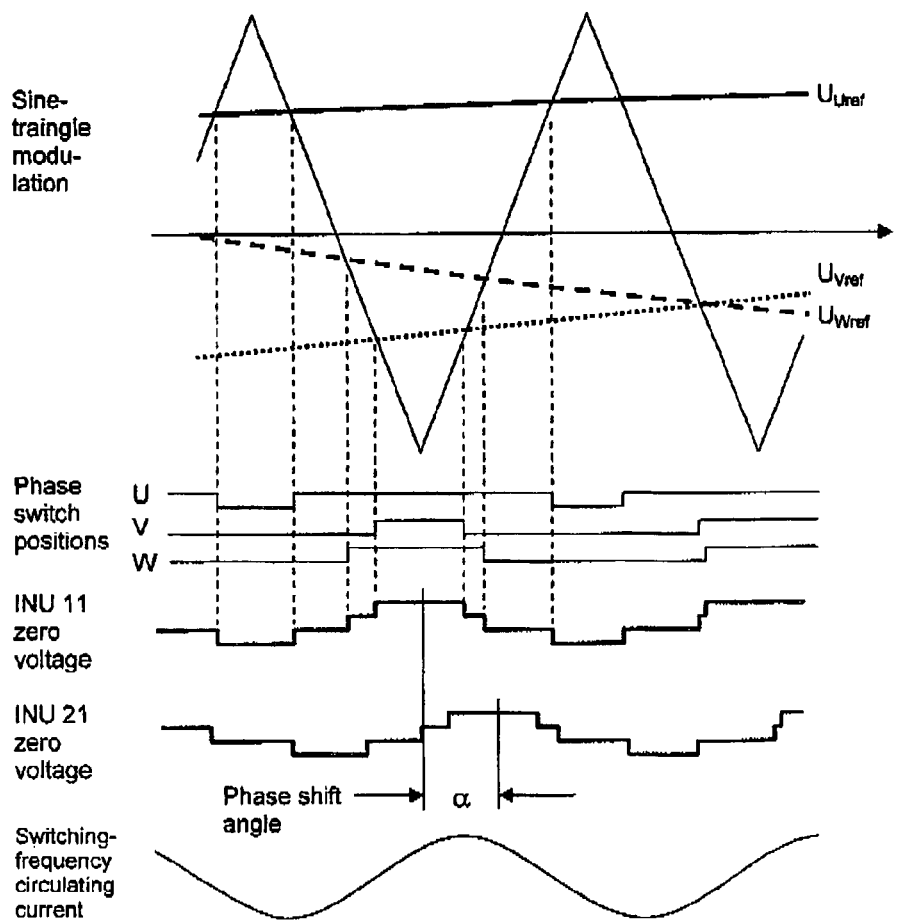

In the following, the invention will be described in detail with reference to examples and the attached drawings, wherein FIG. 1 presents a mains inverter, FIG. 2 presents parallel-connected mains inverters FIG. 3 presents the phase switches of the parallel-connected mains inverters and the circulating current between them, FIG. 4 illustrates synchronization according to the invention of parallel-connected inverter units, FIG. 5 presents a frequency converter provided with a mains inverter, FIG. 6 presents a parallel connection of two frequency converters re-injecting braking energy into the supply network, FIG. 7 presents the phase switches of the parallel-connected frequency converters re-injecting braking energy into the supply network and the circulating current between the switches, and FIG. 8 illustrates the set-up of a circulating current.

EXAMPLE 1

FIG. 1 presents a three-phase PWM mains inverter, which has a mains bridge INU for rectifying a three-phase alternating voltage from a supply network consisting of phase voltages $U_U$, $U_V$, $U_W$ to produce an intermediate-circuit DC voltage $U_{DC}$. The mains bridge has in each branch controllable semiconductor components, e.g. IGBTs, V1-V6 and diodes D1-D6 connected in inverse-parallel with these. It is connected to an alternating-current network $U_L$ via an LCL filter unit LFU consisting of inductors $L_1$ and $L_2$ and a capacitor $C_1$. The circuit permits a flow of negative intermediate-circuit current in the direction of the supply network. The semiconductor switches of the mains inverter bridge are controlled e.g. by a modulator based on sine-triangle comparison.

FIG. 2 presents two parallel-connected inverter units INU1 and INU2, which are connected to a three-phase alternating-current network $U_L$ via an LCL filter unit consisting of inductors $L_1$ and $L_2$ and a capacitor $C_1$. Each inverter unit is controlled according to the invention by a separate sine-triangle modulator, wherein the reference frequencies (switching frequencies) of the triangular waves have been set to be the same in both of the parallel inverter units.

The modulation pulse patterns are synchronized to each other by measuring the modulation-frequency circulating current caused by the phase difference between the zero components of the three-phase voltage pattern produced by the phase switches. The matter is clarified by FIG. 4, which represents modulation performed on the known sine-triangle comparison principle and the star point voltage formed thereby, which is called the zero component of the voltage. The zero voltage of inverter unit INU1 represents the zero voltage produced by the modulation illustrated in the figure, and the zero voltage of inverter unit INU2 represents the zero voltage produced by the modulation of the other inverter unit connected in parallel. As can be seen from the figure, the frequency and phase of the zero voltage are bound to the triangular wave. In the example in this figure, the triangular waves of the modulators have a phase shift between them, and a corresponding phase shift of equal magnitude is observed between the zero voltages as well.

For the measurement of the circulating current, first the summed current of the three phases is measured, which differs from zero exactly by the magnitude of the circulating current (in a normal three-phase system without circulating current the summed current is 0). The summed current can be measured e.g. by taking simultaneous samples of the phase currents at the peak of the triangular wave, the normal waviness of the current being thus eliminated. The direction of the circulating current is expressed by multiplying the measurement result by the polarity of the triangular wave (positive peak=1, negative peak=−1).

The instantaneous value of the circulating current is added to the sum of the preceding measurement results, thus obtaining a quantity called 'summed circulating current'. If the summed circulating current exceeds a given maximum value, then for the time of one half of the modulation cycle a switching frequency is momentarily selected that is the next higher switching frequency (=triangular wave frequency) following the reference. On the other hand, if the summed circulating current is lower than the negative maximum value, then a switching frequency that is lower by one step than the reference will be used during the next half of the modulation cycle. This procedure reduces the phase difference of the triangular wave relative to the triangular wave of the parallel INU. When the switching frequency is changed, the summed circulating current is simultaneously reset to zero.

The switching frequency can be changed in proportion to the circulating current in other ways too, e.g. as a PI-controlled phase-locked loop, in which case the frequency of the triangular wave is adjusted in proportion to the detected modulation-frequency circulating current. The aforesaid summing method has the advantage that the summing also reduces measurement noise and instantaneous disturbances or offsets in the sum signal can not be amplified.

The same algorithm can be used in all the parallel-connected devices to synchronize the triangular waves, or alternatively it can be omitted from one device without impairing the performance of the method.

In addition to mains inverters, the method of the invention for the synchronization of modulators can also be used in normal motor feeding applications in which a high power requirement necessitates the use of several inverter units to feed the same motor winding. In a motor feeding application, the solution requires a filter, which in the simplest case is a mere inductor, between the frequency converter and the motor.

EXAMPLE 2

FIG. 5 presents a three-phase PWM frequency converter re-injecting braking energy into the supply network. It has a mains bridge (INU1) for rectifying the three-phase alternating voltage of the supply network consisting of phase voltages $U_U$, $U_V$, $U_W$ to produce an intermediate-circuit DC voltage $U_{DC}$. The mains bridge has in each branch controllable semiconductor components V1-V6, which, as in FIG. 5, consist of e.g. IGBTs and diodes connected in inverse-parallel with them. The mains bridge is connected to the alternating-current network via an LCL filter unit LFU consisting of inductors $L_1$ and $L_2$ and a capacitor $C_1$. The circuit also permits a flow of negative intermediate-circuit current in the direction of the supply network. The semiconductor switches of the mains bridge are controlled e.g. by a known modulator based on sine-triangle comparison. The frequency converter illustrated in FIG. 1 also comprises a load bridge (INU2), which produces from the direct voltage of the direct-voltage intermediate circuit a three-phase output voltage $U_R$, $U_S$, $U_T$, whose amplitude and frequency can be adjusted as desired.

FIG. 6 presents two parallel-connected frequency converters FC1 and FC2, which are connected to a common three-phase alternating-current network $U_L$ via filter units LFU1 and LFU2 and to a common motor provided with double windings via inductors L1 and L2. According to the invention, the phase switches of each mains bridge inverter unit (INU11 and INU21) are controlled by separate sine-triangle modulators, wherein the reference frequencies (=switching frequencies) of the triangular waves have been set to be the same ($f_{K1}$) in both of the parallel inverter units. According to the invention, the phase switches of each load bridge inverter unit (INU12 and INU22) are also controlled by separate sine-triangle modulators, wherein the reference frequencies of the triangular waves have been set to be the same ($f_{K2}$) in both of the parallel inverter units. According to the invention, the switching frequencies $f_{K1}$ and $f_{K2}$ are assigned different values, so that circulating currents of these frequencies can be detected, thus allowing both the modulation pulse patterns of the mains bridges to be synchronized to each other and the modulation pulse patterns of the load bridges to be synchronized to each other to attenuate the circulating currents.

The modulation pulse patterns are synchronized with each other by measuring the modulation-frequency circulating current caused by the phase difference between the zero components of the three-phase voltage pattern produced by the phase switches. The matter is clarified by FIG. 8, which represents modulation performed on the known sine-triangle comparison principle and the virtual star point voltage formed thereby, which is called the zero component of the voltage. The zero voltage of inverter unit INU11 represents the zero voltage produced by the modulation illustrated in the figure, and the zero voltage of inverter unit INU21 represents the zero voltage produced by the modulation of the other inverter unit connected in parallel. As can be seen from the figure, the frequency and phase of the zero voltage are bound to the triangular wave. In the example in this figure, the triangular waves of the modulators have a phase shift a between them, and a corresponding phase shift of equal magnitude is observed between the zero voltages as well.

For the measurement of the circulating current, first the summed current of the three phases is measured, which differs from zero exactly by the magnitude of the circulating current (in a normal three-phase system without circulating current the summed current is 0). The summed current can be measured e.g. by taking simultaneous samples of the phase currents at the peak of the triangular wave, the normal waviness of the current being thus eliminated. The direction of the circulating current is expressed by multiplying the measurement result by the polarity of the triangular wave (positive peak=1, negative peak=−1).

The instantaneous value of the circulating current is added to the sum of the preceding measurement results, a so-called summed circulating current being thus obtained. If the summed circulating current exceeds a given maximum value, then for the time of one half of the modulation cycle a switching frequency is momentarily selected that is the next higher switching frequency (=triangular wave frequency) following the reference. On the other hand, if the summed circulating current is lower than the negative maximum value, then a switching frequency that is lower by one step than the reference will be used during the next half of the modulation cycle. This procedure reduces the phase difference of the triangular wave relative to the triangular wave of the parallel INU. When the switching frequency is changed, the summed circulating current is simultaneously reset to zero.

In the measurement of the summed current, both the circulating current component caused by the mains bridges and the circulating current component caused by the load bridges are visible. However, due to the different switching frequencies, in the long run the circulating current sum for the mains bridge only shows the switching-frequency ($f_{K1}$) circulating current of the mains bridges, and likewise the circulating current sum for the load bridge only shows the switching-frequency ($f_{K2}$) circulating current of the load bridges.

The switching frequency can be changed in proportion to the circulating current in other ways, too, e.g. as a PI-controlled phase-locked loop, in which case the frequency of the triangular wave is adjusted in proportion to the detected modulation-frequency circulating current. The aforesaid summing method has the advantage that the summing also reduces measurement noise and instantaneous disturbances or offsets in the sum signal can not be amplified.

The same algorithm can be used in all the parallel-connected devices to synchronize the triangular waves, or alternatively it can be omitted from one device without impairing the performance of the method.

It is obvious to the person skilled in the art that different embodiments of the invention are not limited to the example described above, but that they may be varied within the scope of the claims presented below.

The invention claimed is:

1. A method for synchronizing parallel-connected inverter units, said inverters including inverter-specific modulators, or parallel-connected frequency converters re-injecting braking energy into a supply network, said frequency converters having inverter unit-specific modulators both in the mains bridges and in the load bridges, the method comprising;
    measuring the circulating current between the inverter units; and
    synchronizing the modulators to each other on the basis of the current measurement data;
    wherein measuring the circulating current, in the inverter units functioning as mains inverters or in the frequency converters, includes:
    measuring the base current simultaneously and forming a sum of the phase currents;
    detecting the instantaneous value of switching-frequency circulating current by multiplying the sum of the phase currents by the polarity of a triangular wave or a corresponding modulation signal; and
    forming a circulating current sum by summing the successive instantaneous value results.

2. A method according to claim 1, wherein, in the synchronization, in order to prevent the flow of circulating current in the parallel-connected inverter units functioning as mains inverters the triangular waves or corresponding modulation signals of the modulators are synchronized via the following operations, which are performed in all the units:
    a circulating current sum is formed,
    if the circulating current sum exceeds a preset positive limit value, then the switching frequency is increased by a fixed step for a certain time, e.g. for the time of one half of a modulation cycle, and at the same time the circulating current sum is reset to zero, if the circulating current sum is lower than a preset negative limit value, then the switching frequency is decreased by a fixed step for a certain time, e.g. for the time of one half of a modulation cycle, and at the same time the circulating current sum is reset to zero.

3. A method according to claim 2, wherein the synchronization of the triangular waves or corresponding modulation signals is effected by adjusting their frequency in proportion to the detected switching-frequency circulating current.

4. A method according to claim 1 which is used when the parallel-connected inverter units serve as a motor feeding device and feed the same motor winding via a filter consisting of at least an inductor.

5. A method according to claim 1 which is used in all the parallel-connected inverter units except one.

6. A inverter apparatus, comprising:
parallel-connected inverter units, which inverter units are provided with inverter-specific modulators or an apparatus consisting of frequency converters re-injecting braking energy into a supply network, which frequency converters are provided with converter unit-specific modulators both in the mains bridges and in the load bridges;
wherein the apparatus measures the circulating current between the inverter units, and synchronizes the modulators to each other on the basis of the current measurement data;
wherein the apparatus measuring the circulating current, in the inverter units functioning as mains inverters or in the frequency converters, includes measuring the phase currents simultaneously and forming a sum of the phase currents, detecting the instantaneous value of the switching-frequency circulating current by multiplying the sum of the phase currents by the polarity of a triangular wave or corresponding modulation signal, and forming a circulating current sum by summing the successive instantaneous value results.

7. An apparatus according to claim 6, wherein in the synchronization, in order to prevent the flow of circulating current in the parallel-connected inverter units functioning as mains inverters the triangular waves or corresponding modulation signals of the modulators are synchronized in such manner that in the modulators in all the units a circulating current sum is formed,
the switching frequency is increased by a fixed step for a certain time, e.g. for the time of one half of a modulation cycle, if the circulating current sum exceeds a preset positive limit value, and at the same time the circulating current sum is reset to zero,
the switching frequency is decreased by a fixed step for a certain time, e.g. for the time of one half of a modulation cycle, if the circulating current sum is lower than a preset negative limit value, and at the same time the circulating current sum is reset to zero.

8. An apparatus according to claim 6, which is used when the parallel-connected inverter units serve as a motor feeding device and feed the same motor winding via a filter consisting of at least an inductor.

9. An apparatus according to any one of claim 6, which is used in all the parallel-connected inverter units except one.

10. A method according to claim 1, wherein the switching frequency ($f_{K1}$) of the mains bridges has been set to be mutually the same but different from the switching frequency ($f_{K2}$) of the load bridges.

11. An apparatus according to claim 6, wherein the switching frequency ($f_{K1}$) of the mains bridges has been set to be mutually the same but different from the switching frequency ($f_{K2}$) of the load bridges.

12. An apparatus according to claim 6, wherein, to prevent the flow of circulating current between the parallel-connected frequency converters, the triangular waves or corresponding modulation signals of their inverter unit-specific modulators are synchronized in such manner that in all the units:
a circulating current sum is formed,
the switching frequency is increased by a fixed step for a certain time, e.g. for the time of one half of a modulation cycle, if the circulating current sum exceeds a preset positive limit value, and at the same time the circulating current sum is reset to zero,
the switching frequency is decreased by a fixed step for a certain time, e.g. for the time of one half of a modulation cycle, if the circulating current sum is lower than a preset negative limit value, and at the same time the circulating current sum is reset to zero.

* * * * *